United States Patent [19]
Wolf

[11] 3,843,586
[45] Oct. 22, 1974

[54] PROCESS FOR PREPARING A FOAMABLE MATERIAL FOR SEALING RUBBER ARTICLES UPON PRESSURE REDUCTION THEREOF

[75] Inventor: Johannes Hendrik Leendert Wolf, Uithoorn, Netherlands

[73] Assignee: Aerochem N. V., Amsterdam, Netherlands

[22] Filed: Nov. 4, 1969

[21] Appl. No.: 873,959

[52] U.S. Cl.............. 260/29.7 R, 141/38, 252/350, 252/305, 260/2.5 L, 260/29.7 E, 260/29.7 GP, 260/33.8 U
[51] Int. Cl...................... C08d 13/10, C08d 13/24
[58] Field of Search .... 260/2.5 L, 29.7 EM, 29.7 E, 260/29.7 GP; 252/307, 305

[56] References Cited
UNITED STATES PATENTS
3,293,197  12/1966  Vincent............................ 260/2.5 L
3,370,024  2/1968  Grasko et al. ............... 260/29.7 GP

FOREIGN PATENTS OR APPLICATIONS
601,898  7/1960  Canada ........................... 260/2.5 L
972,602  7/1962  Great Britain .................. 260/2.5 L

*Primary Examiner*—Theodore Morris
*Attorney, Agent, or Firm*—Diller, Brown, Ramik and Wight

[57] ABSTRACT

A hermetically sealed aerosol package containing a composition comprising polyisoprene, an emulsifier, an agent lowering the freezing point, water, and a liquid gas as propellant, and is capable of foaming upon pressure reduction to seal hollow gas-permeable rubber articles.

5 Claims, 1 Drawing Figure

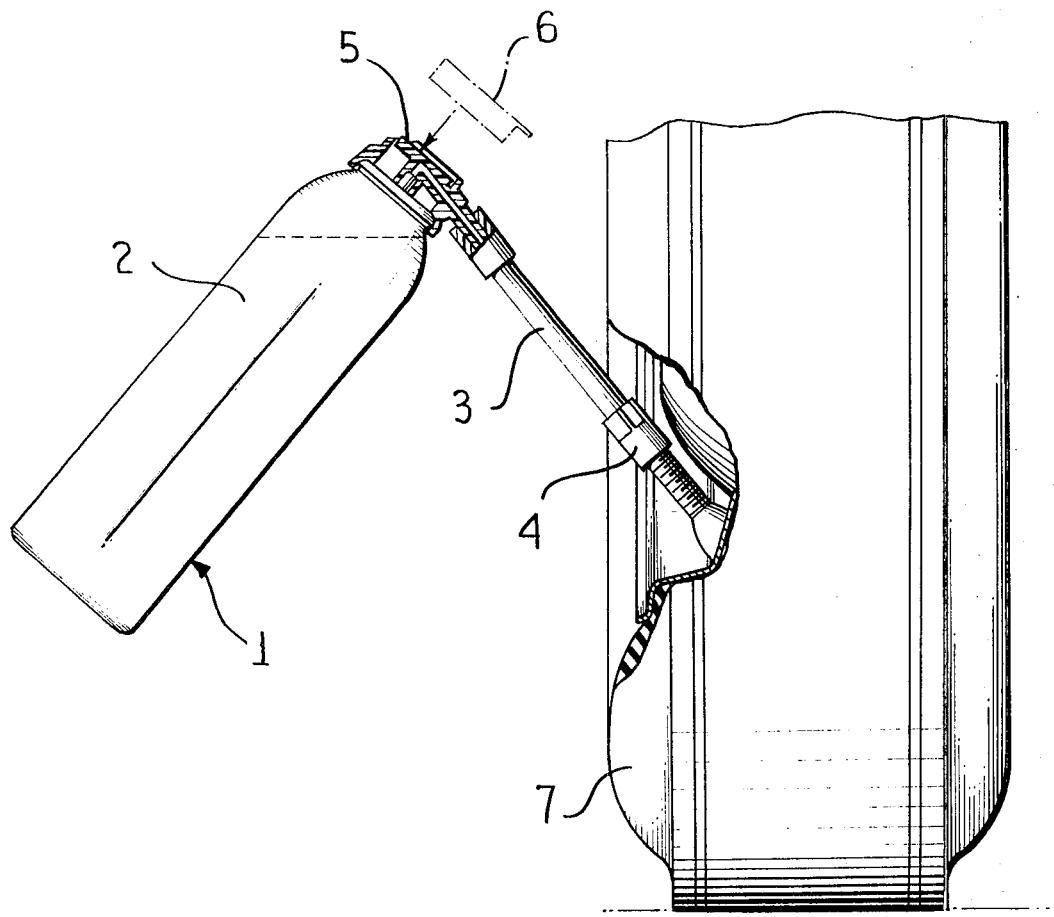

PROCESS FOR PREPARING A FOAMABLE MATERIAL FOR SEALING RUBBER ARTICLES UPON PRESSURE REDUCTION THEREOF

The present invention relates to spray bombs capable of foaming upon pressure reduction and being adaptable to seal hollow gas-permeable rubber articles, and which is in the form of an emulsion comprising polyisoprene latex, an agent lowering the freezing point, water, and liquid gas as propellant.

A charge used for the above sealing purposes is particularly related to the sealing of punctured tubes or tubeless tires. To this effect the spray bomb or aerosol-type container is connected to the valve of the tire and the charge is sprayed into the tube or tire under the influence of the propellant, while foaming. Due to the expansion of the propellant, the tire is inflated and the rubber latex seals the puncture by coagulation.

For the charge to produce a good effect, highly specific demands are made on its composition and its performance. On the one hand, the foam formed from the charge injected into the tire should rapidly coagulate adjacent a puncture, and on the other hand, it should be so stable in the remaining part of the hollow space that the latex is deposited on the inner surface of that space in the form of a uniform film without lumping. In the nonsprayed condition the charge must be a stable oil/water emulsion in the spray bomb, with latex and propelling gas as the discontinuous phase, of which the distribution in the continuous phase should be homogeneous to the extent that a foam having a fine cellular structure is formed upon spraying.

All charges known hitherto are based on butyl latex as the rubber component. However, this material has proved to be less suited for the present purpose because it coagulates with difficulty and the coagulate has but a small firmness and a low consistency which adversely affects the sealing properties. Accordingly, these drawbacks have been eliminated to some extent by adding filling materials, such as asbestos, to the charge. However, this presents other problems, such as a worsening of the rheological properties in the bomb, the hazard of clogging narrow passages through which the charge is passed for spraying, for example the tire valve, and sagging and formation of a compact bottom cake in the bomb.

Of course the filling material should not attack the materials with which it is contacted, such as rubber and lining of the tire and the metal of the wheelrim.

In keeping with the above, it is an object of this invention to provide a process for producing a charge for spray bombs which does not have the noted drawbacks and which, in the sprayed condition as foam, meets the requirements made and is capable of sealing hollow gas-permeable articles of rubber quickly and satisfactorily.

It has been found that this object is achieved by the process according to this invention which comprises forming a non-cationic emulsion based on polyisoprene latex while adding an emulsifying agent containing at least one emulsifier of the group consisting of a cationic, anionic, amphoteric and non-ionic emulsifier, said emulsifying agent having an HLB-value of 4–10.

By HLB-value is meant the hydrophilic-lipophilic balance, an important magnitude for the characterization of emulsifiers.

Details about the method for determining the HLB-value of an emulsifier are described for example in an article by W. C. Griffin in Off. Digest of the Federation of Paint and Varnish Manufacturers 28 (1956) 466–475.

The formation of finely divided mixed emulsion in water of on the one hand polyisoprene latex and on the other hand the liquified propellant depends on the correct HLB-value selected, while the HLB-value, in conjunction with the amount of emulsifier material added, determines the stability of the mixed emulsion and thus of the filling material.

The polyisoprene latex used as rubber component can excellently be converted into an emulsion of finely divided latex droplets in the aqueous phase and then be stabilized.

The combination of polyisoprene latex and an emulsifier or mixture of emulsifiers having a HLB-value of 4–10, to be applied according to the invention, results in a charge which meets the above-mentioned requirements to the best possible extent, i.e., it forms in the spray bomb an emulsion with almost unlimited keeping qualities, and when sprayed it produces a finely cellular, stable foam, which, however, with the charge being used for sealing a puncture, readily coagulates under the influence of the forces created adjacent the puncture when the gas issues, to form a firm coagulate which rapidly and completely seals the puncture. Thus it has been found for an automobile tire that punctures having a diameter of 4 mm are permanently sealed within one minute by the charge according to the present invention.

The polyisoprene latex may be normal commercially available latex, such as Cariflex IR 700 manufactured by the Shell Corporation.

Cationic as well as anionic, nonionic and/or amphoteric emulsifiers can be applied. They may be normal commercially available products such as sorbitanmonolaurate, sorbitanmonostearate and the ethoxylated compounds thereof (non-ionics), manufactured by Atlas Goldschmidt; potassium resinate (anionic), manufactured by Hercules Powder, Deriphat 151 (amphoteric), also manufactured by Atlas Goldschmidt.

Suitable cationic emulsifiers with an HLB-value of 4–10 are for example Belloid FR, manufactured by The Geigy Cy. Ltd.; Alkaterge C, manufactured by Commercial Solvents Corporation and Katioran AF, manufactured by B.A.S.F. Cationic modified fatty amines have the advantage that they have simultaneously a corrosion inhibiting effect.

Since the ultimate emulsifying agent should not be cationic, the Epton titration is used to determine proper adjustment.

In the selection of the propellant, adequate vapor pressure must be insured in order to bring, for example, a punctured tire, which is being repaired, rapidly to a sufficiently high pressure (1–2 $kg/cm^2$ overpressure) at temperatures of about 0°–30°C. Besides, the propellant must not affect the material, such as rubber, with which it is in contact. Suitable propelling gases are Freon 12 (dichlorodifluoromethane) and aliphatic hydrocarbons, such as propane/butane mixtures.

If it is intended to improve the keepability of the polyisoprene latex formed by coagulation, anti-oxidants may be added. A suitable anti-oxidant is for example N,N'-dinaphthyl-p-phenylenediamine. Deriphat 151, mentioned above appeared to improve the keepability of the latexfilm as well.

The composition according to the invention may also comprise a corrosion-inhibitor such as, for example, 2,6-ditert.butyl-4-methylphenol.

In order to prevent freezing and consequently blocking it is desirable to incorporate an freezing point lowering agent, for example ethylene glycol.

While maintaining the above mentioned range of the HLB-value two types of emulsifying agents are preferably used. One of them is a mixture of a nonionic, an anionic and/or an amphoteric emulsifier, and particularly a mixture of a nonionic and an amphoteric emulsifier. The amphoteric emulsifier has the advantage of having a high pH, as a result of which corrosion inhibiting properties are imported to the charge. The other one is a mixture of a cationic and a nonionic emulsifier, in particular in a concentration of 0.25–0.40 vol. % nonionic emulsifier and 0.30–0.60 vol. % cationic emulsifier. The cationic emulsifier makes it possible to achieve a better adjustment of the stability of the various emulsified components; of course the ultimate emulsion, as stated above, should not be cationic.

A charge for spray bombs according to the present invention comprises:

10–50 vol. % of polyisoprene latex (about 65%'s; at most 3 vol. % emulsifying agent)
0–3 vol. % of corrosion inhibitor
0–3 vol. % of anti-oxidant
0–20 vol. % of a freezing point lowering agent
25–75 vol. % of liquid gas as propellant and the balance water.

In the absence of a cationic emulsifier it is preferred to use a charge comprising:

24–45% by weight of polyisoprene latex at most 1% by weight of emulsifying agent
3– 7% by weight of a freezing point lowering agent
30–40% by weight of liquid gas as propellant and the balance water.

In this latter range the most preferred charge comprises:

32–38% by weight of polyisoprene latex
0.3–0.7% by weight of nonionic emulsifier
0.05–0.15% by weight of amphoteric emulsifier
4–6% by weight of ethylene glycol
33–37% by weight of liquid propane/butane mixture and the balance water.

The invention will be further illustrated with reference to the accompanying drawing, and the examples and tests described below.

Referring to the drawing, a spray bomb 1 has a pressure chamber 2 filled with the charge according to this invention, and outlet means 3. The end 4 of said outlet means is adapted to be connected to a hollow rubber article 7, in this case an automobile tire. The spray bomb 1 further comprises valve means 5 for controlling the outlet, and a loosely mountable cap 6.

EXAMPLE I

A charge for spray bomb 1 was prepared from:
19 vol. % of polyisoprene latex (Cariflex IR 700)
0.30 vol. % of laurylpolyglycolether (nonionic emulsifier)
0.30 vol. % of Katioran AF (cationic emulsifier, B.A.S.F.)
65 vol. % of a propane/butane mixture (spec. weight 20°C = 0.7)
3.5 vol. % of ethylene glycol, and the balance water.

A car tire was punctured with a hobnail of 4 mm. The above charge was then injected (inflation time 10 sec.) upon which a gas-tight seal was obtained. No loss in pressure could be observed after 14 days.

EXAMPLE II

The charge for the spray bomb 1 is an emulsion prepared by combining:
35.0% by weight of Cariflex IR 700 (solid content 55%),
0.5 % by weight of Span 20 (a nonionizing emulsifier having a HLB-value of 8.6, manufactured by Atlas-Goldschmidt),
0.1 % by weight of Deriphat 151 (an amphoteric emulsifier having an HLB-value of 15, also manufactured by Atlas-Goldschmidt),
5.0% by weight of ethylene glycol,
24.4% by weight of water,
35.0% by weight of propane/butane gaseous mixture.

Elaborate tests were conducted with this charge to control the sealing of punctured tubeless automobile, cycle, and motorcycle tires.

Tests 1–4. Cycle tires.

Cycle tires having a size of 28 × 1½ were punctured by various types of nails and a fragment of glass. The charge having the composition stated above was sprayed into the tires thus damaged, after which the tires were taken for some minutes' riding to effect a thorough spreading of the material sprayed into the tires, and subsequently the tires were checked for tightness in a water bath and the loss of pressure was observed for a number of days after.

The following results were obtained:

Table I

| Test No. | Perforation with | Inflating Time sec | Riding time min | Checking for tightness in a water bath | Loss of pressure in 10 days |
|---|---|---|---|---|---|
| 1 | hobnail | 15 | 5 | gas-tight | none |
| 2 | square nail 2½×2½ mm | 10 | 3 | gas-tight | none |
| 3 | 2 mm nail | 10 | 3 | gas-tight | none |
| 4 | fragment of glass cross cut 4 mm | 10 | 3 | gas-tight | none |

The above cycle tires, which had been treated once, were perforated 15 times again by drawing-pins and naials. No punctures formed, as could be determined by immersion in a water bath, and after 5 days there had not yet been any loss of pressure. The same result was obtained after the tires had been perforated again by a 4 mm fragment of glass. Consequently, tires that have been treated are considerably more resistant to subsequent small perforations.

It was impossible for abnormally large punctures of, say, 8 mm to be sealed by one injection of the charge. However, after the tire had stood for about 1 hour with the puncture in the lowest position, the amount of coagulated latex collected adjacent the puncture appeared to be sufficient for it to be sealed, as was proved by inflating the tire.

The sealing of small punctures required relatively more time than the larger punctures. However, this does not matter much, because the loss of gas is much lower in the case of small punctures.

Test 5. Motorcycle tires.

Tests with motorcycle tires, which were analogous to the tests with cycle tires as described above, produced analogous results.

Three tires were tested in practice such that after the injection of the charge according to the invention the tire was road tested at a speed of 40 km/h over a distance of 2 km. Afterwards in all cases the punctures were tested and found to be sealed.

With a large perforation having a diameter of 3 mm at first the foam was seen to emerge. After 50 mm riding this loss of foam appeared to have stopped. Ten days after the treatment none of the test tires had lost pressure yet.

Test 6.

A four-yeald old, porous tire of a child's cycle (20×1-⅜) was treated once. There was no loss of pressure after the treatment. It follows from this that porous rubber articles can also be sealed, albeit that the average time required for this kind of sealing is more than is required for sealing a puncture, for it is not only one specific spot on which coagulation takes place, bu the entire interior of the article must be coated with a thin latex film of the charge.

Test 7. Automobile tires.

Both conventional and radial tires, tube and tubeless, were exposed to severe tests. The procedure was as follows.

Conventional new tires were punctured by driving over a board with a nail of 3 mm in diameter, while the radial tires were punctured by a piercing awl having a diameter of 4 mm. Subsequently, the tires were spray-filled with the charge of the latter noted composition and inflated to pressure, after which they were taken for 10 minutes' driving at moderate speed in order for the foam formed to be well spread in the tire and for the puncture to be sealed. In the case of any loss in pressure the tires were inflated to pressure again by normal air, after which the actual tests started.

The tests were made with the following tires:

Table II

| Type Tire | Place | Brand | Size | Serial No. |
|---|---|---|---|---|
| Conventional | a) LF-left-front | Vredestein | 5.50-12 | HND |
| do. | b) RF-right-front | do. | 5.50-12 | 465 ESC |
| do. | b) LB-left-back | do. | 5.50-12 | 467 ESC |
| do. | a) RB-right-back | do. | 5.50-12 | 413 HNK |
| Radial | c) LF | Goodyear | 155-12 | KTAD 212 |
| do. | b) RF | do. | 155-12 | ZC8G 4F6 |
| do. | b) LB | do. | 155-12 | ZC8G 4F6 |
| do. | c) RB | do. | 155-12 | KTAD 212 | a = General tire tube
b = Tubeless
c = Michelin tube

After being assembled, the tires were dynamically balanced.

The tests were made on the motor-racing circuit of Zandvoort. The total number of laps driven was 122, or 511.5 km, which per type of tire is approximately 255 km.

The direction of driving was changed every 10 laps. The average speed was 95 km/h, and the top speed per lap about 125 km/h. In the last lap the average speed was 102-103 km/h, and the top speed 140 km/h.

Both at the beginning of the driving test and every 10 laps thereafter the pressure of the tires was measured and, if necessary, brought to 2.0 kg/cm² overpressure.

The table herebelow shows the results of the driving test.

Table III

| Place | Pressure of the tire in kg/cm² after, successively: | | | | | |
|---|---|---|---|---|---|---|
| | 10 laps to the right | 10 laps to the left | 10 laps to the right | 10 laps to the left | 10 laps to the right | 10 laps to the left |
| Conventional tires | | | | | | |
| LF | 2.5 | 2.0 | 2.1 | 2.0 | 2.0 | 1.9 |
| RF | 2.5 | 2.15 | 2.0 | 2.1 | 1.95 | 2.1 |
| LB | 2.3 | 2.0 | 2.0 | 1.95 | 2.0 | 1.9 |
| RB | 2.3 | 2.0 | 2.0 | 2.1 | 1.9 | 2.1 |
| Radical tires | | | | | | |
| LF | 1.8 | 1.7 | 1.95 | 1.9 | 2.1 | 2.0 |
| RF | 2.6 | 2.2 | 1.85 | 2.1 | 1.9 | 2.05 |
| LB | 2.75 | 2.0 | 2.0 | 1.9 | 2.0 | 1.9 |
| RB | 2.4 | 2.2 | 1.9 | 2.1 | 1.9 | 2.1 |

The above results show that the left-front tire of the radial tires was at first not quite sealed. After 20 seconds it was. The general conclusion is that in spite of the outstandingly severe conditions, which was shown by the heavily worn profile of the tires, a dependable seal is obtained by the charge according to this invention.

I claim:

1. A hermetically sealed aerosol package containing a composition which will foam upon the pressure reduction obtained by the discharge of said composition from said package and constituted to seal hollow gas-permeable rubber articles, comprising an aqueous emulsion of polyisoprene and a liquified gas propellant, said emulsion including at least one emulsifying agent selected from the group consisting of cationic, non-ionic, amphoteric, and anionic emulsifiers, said emulsifying agent having an HLB-value of from 4 to 10 and in its final composition being non-cationic.

2. The package of claim 1 wherein the said composition comprises 10 to 50 volume percent of a 65 percent aqueous solution of polyisoprene latex, 25 to 75 volume percent of a liquified gas propellant, 0 to 3 volume percent of a corrosion inhibitor, 0 to 3 volume percent of an antioxidant, 0 to 20 volume percent of a freezing point lowering agent, up to 3 volume percent emulsifying agent, and the balance water; said emulsifying agent being present in an amount effective to form an emulsion of the aforesaid components.

3. The package of claim 1 wherein said emulsifying agent comprises a mixture of cationic and non-ionic emulsifiers.

4. The package of claim 1 wherein said composition comprises 24 to 45 weight percent polyisoprene latex, 3 to 7 weight percent of a freezing point lowering agent, 30 to 40 weight percent of a liquified gas propellant, up to 1 weight percent of an emulsifying agent, and the balance water; said emulsifying agent being present in an amount effective to form an emulsion of the aforesaid components.

5. The package of claim 4 wherein the emulsifying agent comprises a mixture of a non-ionic and amphoteric emulsifier.

* * * * *